(12) United States Patent
Allin et al.

(10) Patent No.: US 9,927,618 B2
(45) Date of Patent: Mar. 27, 2018

(54) STRAP SYSTEMS FOR HEAD-MOUNTED DISPLAYS

(71) Applicant: Oculus VR, LLC, Menlo Park, CA (US)

(72) Inventors: Boyd Drew Allin, Seattle, WA (US); Clare Regimbal Long, Edmonds, WA (US); Peter Wesley Bristol, Seattle, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 14/681,001

(22) Filed: Apr. 7, 2015

(65) Prior Publication Data

US 2016/0299346 A1    Oct. 13, 2016

(51) Int. Cl.
*G02B 27/00*    (2006.01)
*G02B 27/01*    (2006.01)

(52) U.S. Cl.
CPC ................. *G02B 27/0176* (2013.01)

(58) Field of Classification Search
CPC .. G02B 23/125; G02B 27/0176; G02B 7/002; A42B 3/085; A42B 3/145
USPC ........................................................ 224/181
See application file for complete search history.

(56) References Cited

U.S. PATENT DOCUMENTS

| | | | | |
|---|---|---|---|---|
| 1,356,708 A | * | 10/1920 | Goodyear | G02B 7/002 128/207.11 |
| 1,706,601 A | * | 3/1929 | Drager | A62B 18/084 128/207.11 |
| 2,784,713 A | * | 3/1957 | Green | A62B 18/084 2/206 |
| 4,457,461 A | * | 7/1984 | Docking | G12B 9/08 2/422 |
| 4,741,054 A | * | 5/1988 | Mattes | A42B 3/08 2/421 |
| 4,753,378 A | * | 6/1988 | Kastendieck | A42B 3/04 224/181 |
| 4,766,610 A | * | 8/1988 | Mattes | A42B 3/127 2/414 |
| 5,321,416 A | * | 6/1994 | Bassett | A42B 3/145 345/8 |
| 5,469,578 A | * | 11/1995 | Mattes | G02B 23/125 2/6.7 |

(Continued)

*Primary Examiner* — Peter Helvey
(74) *Attorney, Agent, or Firm* — Morgan, Lewis & Bockius LLP

(57) ABSTRACT

A strap system for a head-mounted display includes a first flexible non-stretchable section to wrap around the head-mounted display and extend laterally towards a user's ears, a second flexible non-stretchable section to extend from a first side of the first flexible non-stretchable section towards the back of the user's first ear and split into an upper portion and a lower portion, and a third flexible non-stretchable section to extend from a second side of the first flexible non-stretchable section to the back of the user's second ear and split into an upper portion and a lower portion. The upper portion of the second flexible non-stretchable section substantially mirrors the upper portion of the third flexible non-stretchable section. The lower portion of the second flexible non-stretchable section substantially mirrors the lower portion of the third flexible non-stretchable section.

16 Claims, 6 Drawing Sheets

(56) References Cited

U.S. PATENT DOCUMENTS

| | | | | |
|---|---|---|---|---|
| 6,701,535 B2* | 3/2004 | Dobbie | A42B 3/085 | |
| | | | 2/421 | |
| 6,912,727 B2* | 7/2005 | Buchanan, Jr. | G02B 7/002 | |
| | | | 2/414 | |
| 6,986,162 B2* | 1/2006 | Soto | G02B 7/002 | |
| | | | 2/422 | |
| 8,438,668 B2* | 5/2013 | Garneau | A42B 3/085 | |
| | | | 2/421 | |
| 8,928,557 B2* | 1/2015 | Nakabayashi | G02B 27/0176 | |
| | | | 2/414 | |
| 2006/0225187 A1* | 10/2006 | Wu | A42B 3/145 | |
| | | | 2/425 | |
| 2010/0327028 A1* | 12/2010 | Nakabayashi | G02B 27/0176 | |
| | | | 224/162 | |
| 2012/0280007 A1* | 11/2012 | Nakabayashi | G02B 27/0176 | |
| | | | 224/181 | |
| 2013/0306689 A1* | 11/2013 | Johnson | A45C 11/00 | |
| | | | 224/181 | |
| 2013/0327909 A1* | 12/2013 | Freelander | A45F 5/00 | |
| | | | 248/224.7 | |
| 2014/0263493 A1* | 9/2014 | Amurgis | H04R 5/0335 | |
| | | | 224/181 | |
| 2015/0122849 A1* | 5/2015 | Jones | F16M 13/04 | |
| | | | 224/181 | |

\* cited by examiner

STRAP SYSTEMS FOR HEAD-MOUNTED DISPLAYS

TECHNICAL FIELD

This application relates generally to wearable technology, including but not limited to flexible strap systems for a head-mounted display.

BACKGROUND

Virtual reality head-mounted displays have wide applications in various fields, including engineering design, medical surgery practice, military simulated practice, and video gaming. For example, a user wears a virtual reality head-mounted display while playing video games so that the user can have a more interactive experience in a virtual environment.

These virtual reality head-mounted displays, however, may make it difficult for a user to properly adjust and comfortably wear the head-mounted displays using the existing systems, and thus negatively affect the user's experience.

SUMMARY

The embodiments of the present disclosure provide strap systems for a head-mounted display. In accordance with some embodiments, a strap system includes a first flexible non-stretchable section to wrap around the head-mounted display and extend laterally towards a user's ears, a second flexible non-stretchable section to extend from a first side of the first flexible non-stretchable section towards the back of the user's first ear and split into an upper portion and a lower portion, and a third flexible non-stretchable section to extend from a second side of the first flexible non-stretchable section to the back of the user's second ear and split into an upper portion and a lower portion. The upper portion of the second flexible non-stretchable section is to extend in a first direction on the user's head and conform to a first region of the user's head. The lower portion of the second flexible non-stretchable section is to extend in a second direction to conform to a second region of the user's head. The lower portion of the second flexible non-stretchable section is below the upper portion of the second flexible non-stretchable section when the head-mounted display is on the user's head. The upper portion of the third flexible non-stretchable section is to extend in a third direction on the user's head and conform to a third region of the user's head, and the third direction substantially mirrors the first direction. The lower portion of the third flexible non-stretchable section is to extend in a fourth direction to conform to a fourth region of the user's head. The lower portion of the third flexible non-stretchable section is below the upper portion of the third flexible non-stretchable section when the head-mounted display is on the user's head.

In accordance with some embodiments, a strap system for a head-mounted display includes a first flexible non-stretchable section to wrap around the head-mounted display and extend laterally towards a user's ears, a second flexible non-stretchable section to extend from a first side of the first flexible non-stretchable section along a first direction towards the back of the user's head, a third flexible non-stretchable section to extend from a second side of the first flexible non-stretchable section along a second direction toward the back of the user's head, and a stretchable top strap coupled between the second flexible non-stretchable section and the third flexible non-stretchable section, to extend across a top region of the user's head. The top strap includes a first end coupled to the second flexible non-stretchable section and a second end coupled to the third flexible non-stretchable section. The first end and the second end of the top stretchable band are opposite to each other.

In accordance with some embodiments, a strap system for a head-mounted display includes a first flexible non-stretchable section to wrap around the head-mounted display and extend laterally towards a user's ears, a second flexible non-stretchable section to extend from a first side of the first flexible non-stretchable section toward the back of the user's head and split into an upper portion and a lower portion, and a third flexible non-stretchable section to extend from a second side of the first flexible non-stretchable section toward the back of the user's head and split into an upper portion and a lower portion. The upper portion of the second flexible non-stretchable section is to extend towards a top-front region of the user's head, the lower portion of the second flexible non-stretchable section is to extend towards a lower-back region of the user's head, and the upper portion and the lower portion of the second flexible non-stretchable section extend opposite to each other along a first linear dimension. The upper portion of the third flexible non-stretchable section is to extend towards the top-front region of the user's head, the lower portion of the third flexible non-stretchable section is to extend towards the lower-back region of the user's head, and the upper portion and the lower portion of the third flexible non-stretchable section extend opposite to each other along a second linear dimension. The second linear dimension substantially mirrors the first linear dimension.

Various advantages of the present application are apparent in light of the descriptions below.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

Like reference numerals refer to corresponding parts throughout the several views of the drawings.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
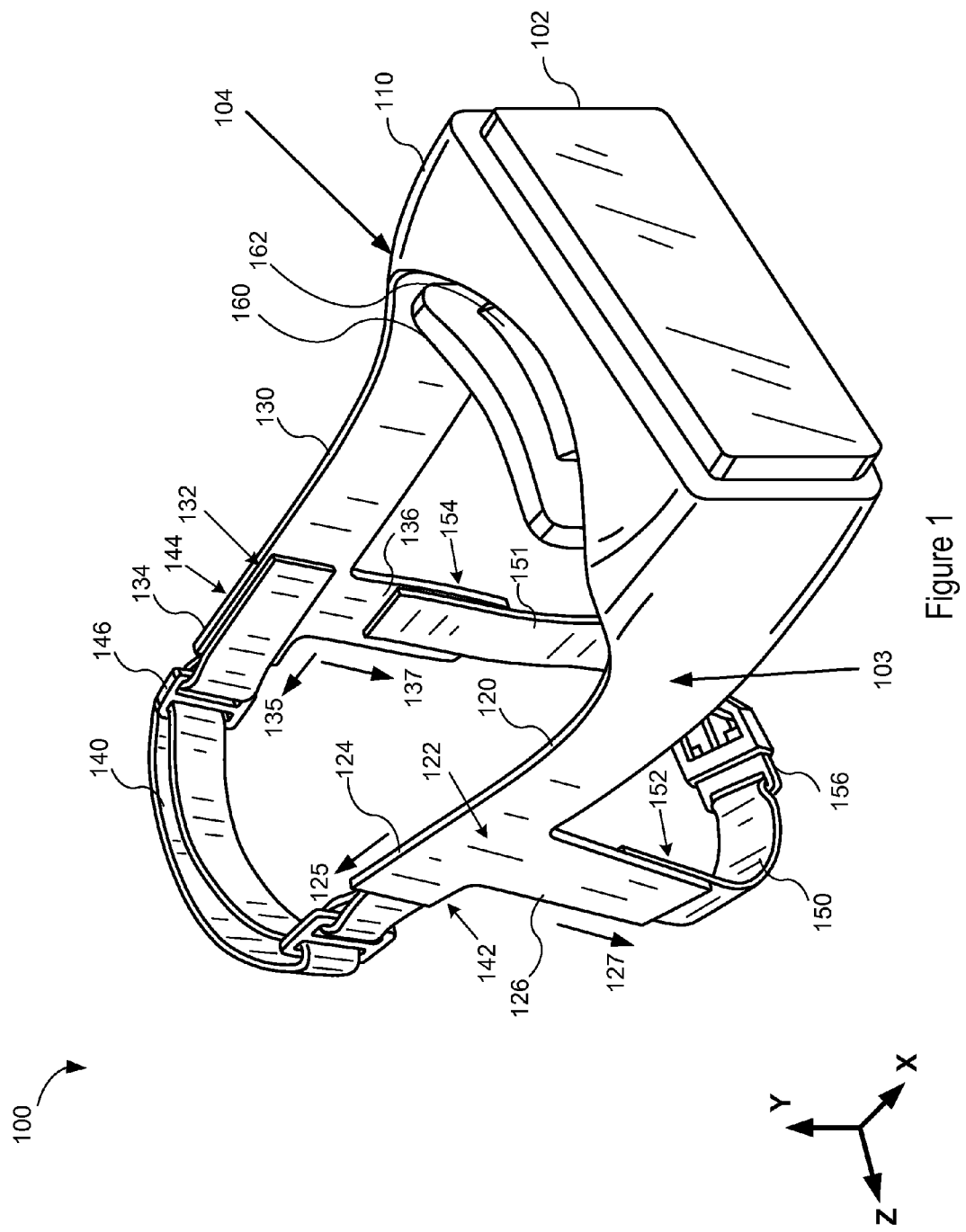
FIGS. 1-5 are perspective views of flexible strap systems for head-mounted displays in accordance with some embodiments.

FIG. 1 is a perspective view of a flexible strap system 100 for a head-mounted display 102 in accordance with some embodiments. As shown in FIG. 1, the flexible strap system 100 is used for encasing the head-mounted display 102 and mounting the head-mounted display 102 on a user's head.

As shown in FIG. 1, the flexible strap system 100 includes an encasing section 110 (i.e., an encasing region, an encasing portion), a side section 120 (i.e., a side region, a side portion), and a side section 130. In some embodiments, each of the encasing section 110, the side section 120, and the side section 130 is made of a flexible (e.g., bendable) and non-stretchable material, such as synthetic rubber, polyurethane sheet, or nylon webbing.

The encasing section 110 wraps around the outside frame of the head-mounted display 102 to encase the head-mounted display 102. In some embodiments, the encasing section 110 extends laterally (e.g., along the −X direction) from a side 103 (e.g., right side) and a side 104 (e.g., left side) of the encasing section 110 towards the user's ears when the head-mounted display 102 is mounted on the user's head. The encasing section 110 is considered as a first flexible non-stretchable section of the strap system 100.

The side section 120 is an elongated section that extends from the side 103 of the encasing section 110 towards the back of the user's ear (e.g., the user's right ear). In some embodiments, the side section 120 is substantially straight and extends laterally (e.g., along the −X direction) towards the back of the user's ear. In some embodiments, the side section 120 is not straight but slightly curves upward as it extends towards the back of the user's ear. The side section 120 is considered as a second flexible non-stretchable section of the strap system 100.

As shown in FIG. 1, the side section 120 splits into an upper portion 124 and a lower portion 126 at a splitting area 122 of the side section 120. In some embodiments, the splitting area 122 is near a region behind the user's ear when the head-mounted display 102 is mounted on the user's head.

In some embodiments, the upper portion 124 of the side section 120 extends in a direction 125. In some embodiments, the direction 125 is substantially lateral along −X direction. In some embodiments, the direction 125 is towards an upper-back direction. In some embodiments, the upper portion 124 extends towards an upper-back region of the user's head above the user's occipital lobe. In some embodiments, the upper portion 124 conforms to a region of the user's head on the right side that is behind the user's ear and above the user's occipital lobe when the head-mounted display 102 is on the user's head.

In some embodiments, the lower portion 126 of the side section 120 extends along a direction 127 on the right side. In some embodiments, the direction 127 is substantially vertical along the −Y direction, or towards a lower-back direction with respect to the user's head. As shown in FIG. 1, the lower portion 126 is below the upper portion 124 when the head-mounted display 102 is on the user's head. In some embodiments, the lower portion 126 extends towards a lower-back region of the user's head below the user's occipital lobe. In some embodiments, the lower portion 126 conforms to a region of the user's head that is below the user's occipital lobe on the right side when the head-mounted display 102 is on the user's head.

Similarly, the side section 130 is an elongated section that extends from the side 104 of the encasing section 110 towards the back of the user's ear (e.g., the user's left ear). In some embodiments, the side section 130 is substantially straight to extend laterally along the −X direction, or slightly curves upward as the side section 130 extends towards the back of the user's ear. The side section 130 is considered as a third flexible non-stretchable section of the strap system 100.

As shown in FIG. 1, the side section 130 splits into an upper portion 134 and a lower portion 136 at a splitting area 132 of the side section 130. In some embodiments, the splitting area 132 is near a region behind the user's ear when the head-mounted display 102 is mounted on the user's head.

In some embodiments, the upper portion 134 of the side section 130 extends along a direction 135. In some embodiments, the direction 135 is substantially lateral along the X dimension, or is towards an upper-back direction. In some embodiments, the upper portion 134 extends towards an upper-back region of the user's head above the user's occipital lobe. In some embodiments, the upper portion 134 conforms to a region of the user's head on the left side that is behind the user's ear and above the user's occipital lobe when the head-mounted display 102 is on the user's head.

In some embodiments, the lower portion 136 of the side section 130 extends along a direction 137 on the left side. In some embodiments, the direction 137 is substantially vertical, e.g., along the −Y direction, or towards a lower-back direction with respect to the user's head. As shown in FIG. 1, the lower portion 136 is below the upper portion 134 when the head-mounted display 102 is on the user's head. In some embodiments, the lower portion 136 extends towards a lower-back region of the user's head below the user's occipital lobe. In some embodiments, the lower portion 136 conforms to a region of the user's head that is below the user's occipital lobe on the left side when the head-mounted display 102 is on the user's head.

In some embodiments, the side section 130 substantially mirrors the side section 120. In some embodiments, the positions of the splitting area 132, the upper portion 134, and the lower portion 136 of the side section 130 substantially mirror the splitting area 122, the upper portion 124, and the lower portion 126 of the side section 120 respectively. In some embodiments, the direction 125 substantially mirrors the direction 135, and the direction 127 substantially mirrors the direction 137 in FIG. 1. "Substantially" in the present disclosure should be understood as being within manufacturing tolerances and accounting for uneven mounting on the user's head and/or any asymmetry of the user's head.

In some embodiments, the strap system 100 further includes one or more stretchable straps to couple a free end of the upper portion 124 with a free end of the upper portion 134. For example, as shown in FIG. 1, a stretchable strap 140 is used to couple the upper portion 124 and the upper portion 134 to adjustably fit the strap system 100 to the user's head. In some embodiments, the stretchable strap 140 is made of an elastic and stretchable material, such as polyester woven elastic. In some embodiments when the head-mounted display 102 is mounted on the user's head, the stretchable strap 140 rests against an upper-back region of the user's head (e.g., above the user's occipital lobe). In some embodiments, the stretchable strap 140 has a first end coupled to (142) the free end of the upper portion 124 and a second end opposite to the first end and coupled to (144) the free end of the upper portion 134. In some embodiments, the first end and the second end of the stretchable strap 140 are stitched to, screwed to, or adhered to the free ends of the upper portion 124 and upper portion 134 receptively. In some embodiments, the stretchable strap 140 is further coupled to a strap adjuster (e.g., a strap adjuster 146) to adjust a length of the stretchable strap 140 to fit the user's head. In some embodiments (not shown), a single stretchable strap is also used to couple the lower portion 126 with the lower portion 136 in a similar manner as for the stretchable strap 140, to adjustably fit the strap system to the user's head.

In some embodiments, the strap system 100 includes more than one stretchable strap (e.g., stretchable straps 150 and 151, which are connectable to each other) to couple the free end of the lower portion 126 with the free end of the lower portion 136 to adjustably fit the strap system to the user's head. For example, stretchable straps 150 and 151 rest against a lower-back region of the user's head (e.g., below the user's occipital lobe). In some embodiments, the stretchable strap 150 has a first end and a second end opposite to each other, and the first end is coupled to (152) the free end of the lower portion 126 (e.g., by stitching, screwing, or adhesion). The stretchable strap 151 has a first end and a second end opposite to each other, and the first end is coupled to (154) the free end of the lower portion 136 (e.g., by stitching, screwing, or adhesion). In some embodiments, the second end of the stretchable strap 150 is connectable with the second end of the stretchable strap 151 using a strap connector 156 to adjustably fit the strap system to the user's head. In some embodiments (not shown), the stretchable strap 150 and/or the stretchable strap 151 further includes a strap adjuster to adjust the length. In some embodiments (not shown), more than one stretchable strap is also used to couple the upper portion 124 and the upper portion 134 in a similar manner as for the stretchable straps 150 and 151 to adjustably fit the strap system to the user's head.

In some embodiments (not shown), the upper portion 124 and the upper portion 134 have suitable lengths such that a free end of the upper portion 124 is directly connectable with a free end of the upper portion 134. Similarly, the lower portion 126 may be directly connectable with the lower portion 136. For example, the free end of the upper portion 124 is connected to the free end of the upper portion 134 using hook-and-loop fasteners (e.g., 342 of FIG. 3).

In some embodiments, the strap system 100 includes a forehead pad 160 coupled to a center of the encasing section 110 to rest against the user's forehead when the head-mounted display 102 is on the user's head. In some embodiments, the forehead pad 160 is coupled to the encasing section 110 by a supporting section 162. In some embodiments, the supporting section 162 protrudes from the encasing section 110 or a part on the head-mounted display 102, such that the forehead pad 160 is situated at the top center of the head-mounted display 102 to rest against the user's forehead.

In some embodiments as shown in FIG. 1, the encasing section 110, the side section 120, the upper portion 124, the lower portion 126, the side section 130, the upper portion 134, and the lower portion 136 are sections of a continuous piece of material, which is made of a flexible (e.g., bendable) and non-stretchable material, such as synthetic rubber, polyurethane sheet or nylon webbing.

Figure 2:
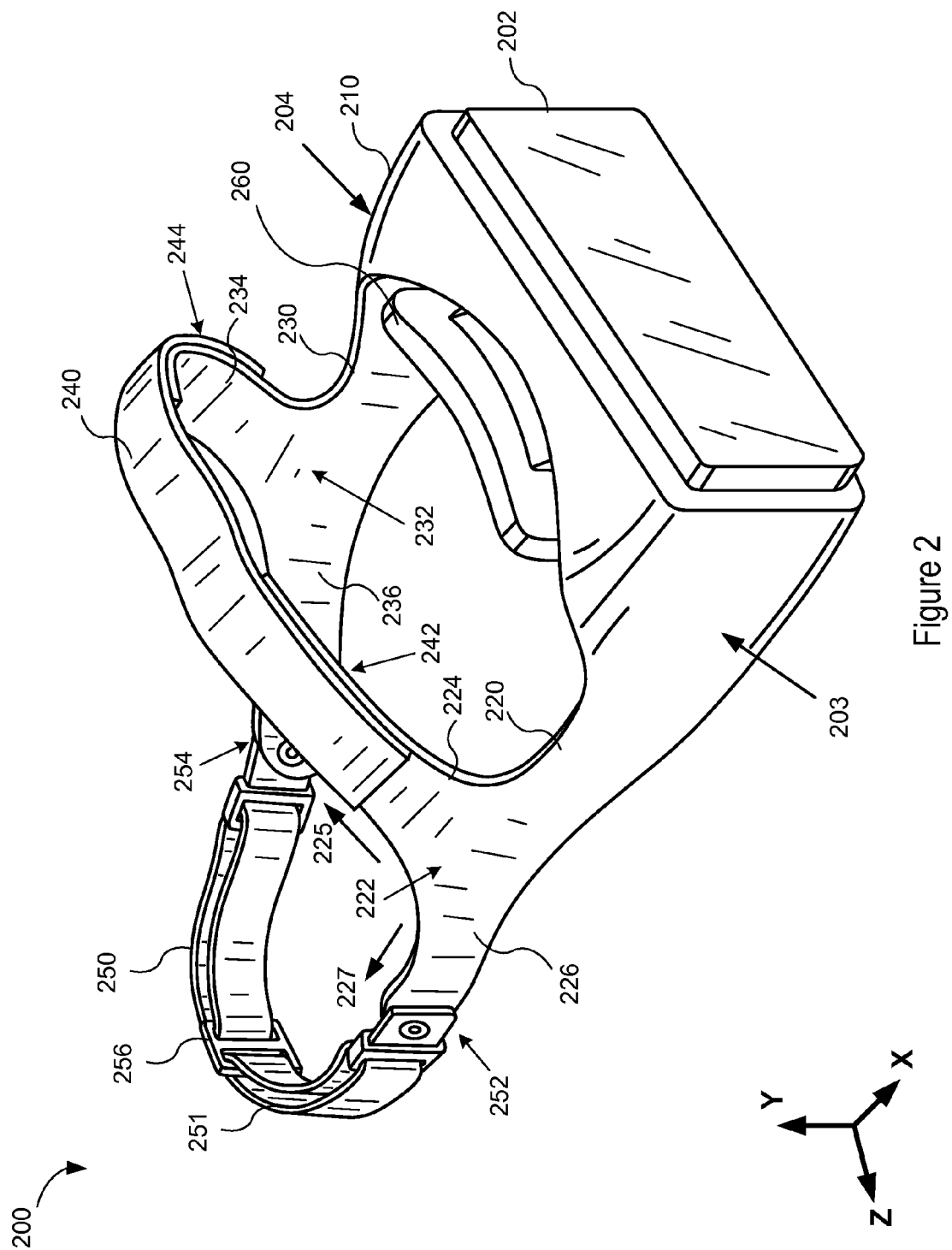

FIG. 2 is a perspective view of a flexible strap system 200 for a head-mounted display 202 in accordance with some embodiments. As shown in FIG. 2, the flexible strap system 200 is used for encasing the head-mounted display 202 and mounting the head-mounted display 202 on a user's head. Similar to the flexible strap system 100 (FIG. 1), the flexible strap system 200 includes an encasing section (i.e., region, portion) 210, a side section 220, and a side section 230, each of which is made from a flexible (e.g., bendable) and non-stretchable material.

The encasing section 210 wraps around the frame of the head-mounted display 202, and further extends laterally (e.g., along the −X dimension) from a side 203 (e.g., right) and a side 204 (e.g., left) of the encasing section 210 towards the user's ears. The encasing section 210 is considered as a first flexible non-stretchable section of the strap system 200.

The side section 220 is an elongated section that extends from the side 203 of the encasing section 210 towards the back of the user's ear. In some embodiments, the side section 220 extends laterally along the −X dimension, or slightly curves upward as the side section 220 extends towards the back of the user's head. The side section 220 is considered as a second flexible non-stretchable section of the strap system 200.

The side section 220 splits into an upper portion 224 and a lower portion 226 at a splitting area 222 of the side section 220. In some embodiments, the splitting area 222 is above and/or behind the user's ear when the head-mounted display 202 is mounted on the user's head. In some embodiments, the upper portion 224 of the side section 220 extends along a direction 225, for example, along a substantially Y direction towards a top region of the user's head, or along a top-front direction towards a top-front region of the user's head. In some embodiments, the lower portion 226 extends along a direction 227, for example, substantially laterally (e.g., along the −X direction) or towards a lower-back direction with respect to the user's head. The lower portion 226 is below the upper portion 224 when the head-mounted display 202 is on the user's head. In some embodiments, the lower portion 226 conforms to a region of the user's head on the right side that is below the user's occipital lobe when the head-mounted display 202 is on the user's head. In some embodiments, the lower portion 226 extends towards a lower-back region of the user's head (e.g., below the user's occipital lobe) when the head-mounted display 202 is on the user's head.

The side section 230 is an elongated section that extends from the side 204 of the encasing section 210 towards the back of the user's ear. In some embodiments, the side section 230 extends laterally along the −X dimension, or slightly bends upward as the side section 230 extends towards the back of the user's head. The side section 230 is considered as a third flexible non-stretchable section of the strap system 200.

The side section 230 splits into an upper portion 234 and a lower portion 236 at a splitting area 232 of the side section 230. In some embodiments, the splitting area 232 is above and/or behind the user's ear when the head-mounted display 202 is mounted on the user's head. In some embodiments, the upper portion 234 extends along a substantially Y direction towards a top region of the user's head, or along a top-front direction towards a top-front region of the user's head. In some embodiments, the lower portion 236 extends along a substantially lateral direction (e.g., along the −X direction) or towards a lower-back direction. The lower portion 236 is below the upper portion 234 when the head-mounted display 202 is on the user's head. In some embodiments, the lower portion 236 extends towards a lower-back region of the user's head and conforms to a region of the user's head on the left side that is below the user's occipital lobe when the head-mounted display 202 is on the user's head.

In some embodiments, the side section 230, the splitting area 232, the upper portion 234, and the lower portion 236 substantially mirror the side section 220, the splitting area 222, the upper portion 224, and the lower portion 226 respectively.

In some embodiments, the flexible strap system 200 further includes one or more stretchable straps to couple a free end of the upper portion 224 with a free end of the upper portion 234. For example, as shown in FIG. 2, a stretchable strap 240 is used to couple the upper portion 224 with the upper portion 234 to adjustably fit the strap system 200 to the user's head. In some embodiments, the stretchable strap 240 is made of an elastic and stretchable material, such as polyester woven elastic. In some embodiments, the stretchable strap 240 rests against a top-front region of the user's head when the head-mounted display 202 is mounted on the user's head. In some embodiments, the stretchable strap 240 has a first end coupled to (242) the free end of the upper portion 224 and a second end opposite to the first end and coupled to (244) the free end of the upper portion 234. In some embodiments, the first end and the second end of the stretchable strap 240 are stitched to, screwed to, or adhered to the free ends of the upper portion 224 and upper portion 234 receptively. In some embodiments, the stretchable strap 240 is further coupled to a strap adjuster (not shown) to adjust a length of the stretchable strap 240 in accordance with the user's head. In some embodiments (not shown), a single stretchable strap is also used to couple the lower portion 226 and the lower portion 236 in a similar manner as for the stretchable strap 240.

In some embodiments, the strap system 200 includes more than one stretchable strap (e.g., stretchable straps 250 and 251) connectable to each other, to couple the free end of the lower portion 226 with the free end of the lower portion 236 to adjustably fit the strap system to the user's head. For example, the stretchable straps 250 and 251 rest against a lower-back region of the user's head (e.g., below the user's occipital lobe) when the head-mounted display 202 is mounted on the user's head. In some embodiments, the stretchable strap 250 has a first end and a second end opposite to each other, and the first end is coupled to (252) the free end of the lower portion 226 (e.g., by stitching, screwing, or adhesion). The stretchable strap 151 has a first end and a second end opposite to each other, and the first end is coupled to (254) the free end of the lower portion 236 (e.g., by stitching, screwing, or adhesion). In some embodiments, the second end of the stretchable strap 250 is connectable with the second end of the stretchable strap 251 using a strap connector 256 to adjustably fit the strap system to the user's head. In some embodiments, the stretchable strap 250 and/or the stretchable strap 251 further includes a strap adjuster to adjust the length. In some embodiments (not shown), more than one stretchable strap is also used to couple the upper portion 224 and the upper portion 234 in a similar manner as for the stretchable straps 250 and 251.

In some embodiments (not shown), the upper portion 224 and the upper portion 234 have suitable lengths such that a free end of the upper portion 224 is directly connectable with a free end of the upper portion 234 to adjustably conform to the top of the user's head. For example, the free end of the upper portion 224 is connected to the free end of the upper portion 234 using hook-and-loop fasteners (e.g., 342 of FIG. 3).

In some embodiments, the strap system 200 includes a forehead pad 260 coupled to a center of the encasing section 210 to rest against the user's forehead when the head-mounted display 202 is on the user's head. In some embodiments, the forehead pad 260 is substantially similar to the forehead pad 160 (FIG. 1).

In some embodiments, the encasing section 210, the side section 220, the upper portion 224, the lower portion 226, the side section 230, the upper portion 234, and the lower portion 236 are sections of a continuous piece of material, which is made of a flexible (e.g., bendable) and non-stretchable material, such as synthetic rubber, polyurethane sheet or nylon webbing.

Figure 3:
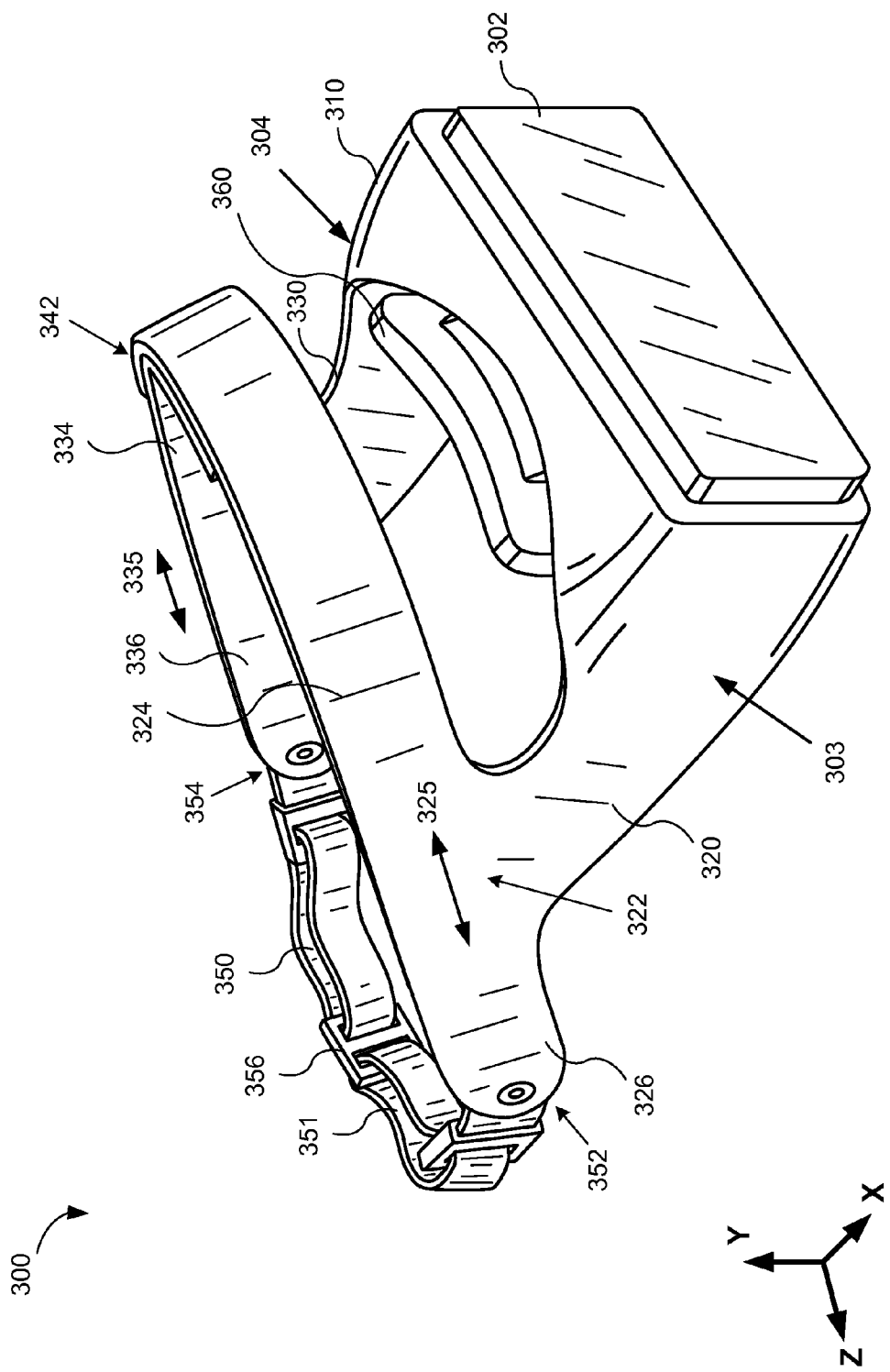

FIG. 3 is a perspective view of a flexible strap system 300 for a head-mounted display 302 in accordance with some embodiments. Similar to the flexible strap system 200 (FIG. 2), the flexible strap system 300 includes an encasing section (i.e., region, portion) 310 for encasing the head-mounted display 302, and side sections 320 and 330 that extend from the encasing section 310 on sides 303 (e.g., right) and 304 (e.g., left) respectively towards the user's ears. The encasing section 310, the side section 320, and the side section 330 are considered as a first flexible non-stretchable section, a second flexible non-stretchable section, and a third flexible non-stretchable section respectively of the flexible strap system 300. The side section 320 splits into an upper portion 324 and a lower portion 326 at a splitting area 322, and the side section 330 similarly splits into an upper portion 334 and a lower portion 336 (e.g., that mirror the upper portion 324 and lower portion 326, respectively). In some embodiments, the strap system 300 includes a forehead pad 360 that is substantially similar to the forehead pad 160 (FIG. 1). In some embodiments, various sections and features of the flexible strap system 300 are substantially similar to the corresponding sections and features of the flexible strap system 200 as discussed for FIG. 2. The flexible strap system 300 may also include various additional features that have not been illustrated for the sake of brevity and so as not to obscure pertinent features of the example embodiments disclosed herein, and a different arrangement of features may be possible.

In some embodiments, the upper portion 324 and the lower portion 326 extend opposite to each other along a first linear dimension 325. Similarly, the upper portion 334 and the lower portion 336 extend opposite to each other along a second linear dimension 335, and the second linear dimension 335 substantially mirrors the first linear dimension 325.

In some embodiments, a free end of the upper portion 324 is connectable with a free end of the upper portion 334 to adjustably conform to the top-front region of the user's head.

For example, the free end of the upper portion 324 is connected to the free end of the upper portion 334 using hook-and-loop fasteners 342. In some embodiments, a length of the upper portion 324 is substantially equal to a length of the upper portion 334. In some embodiments, the length of the upper portion 324 is substantially longer or shorter than the length of the upper portion 334. Although not shown in FIG. 3, the lower portions 326 and 336 can also have suitable lengths to be connectable to each other (e.g., using hook-and-loop fasteners).

In some embodiments, the strap system 300 includes more than one stretchable strap (e.g., stretchable straps 350 and 351, which are connectable to each other) to couple the free end of the lower portion 326 with the free end of the lower portion 336 to adjustably fit the strap system to the user's head. In some embodiments, the stretchable strap 350 has a first end and a second end opposite to each other, and the first end is coupled to (354) the free end of the lower portion 336 (e.g., by stitching, screwing, or adhesion). The stretchable strap 351 has a first end and a second end opposite to each other, and the first end is coupled to (352) the free end of the lower portion 326 (e.g., by stitching, screwing, or adhesion). In some embodiments, the second end of the stretchable strap 350 is connectable with the second end of the stretchable strap 351 using a strap connector 356 to adjustably fit the strap system to the user's head. In some embodiments, the stretchable strap 350 and/or the stretchable strap 351 further includes a strap adjuster to adjust the length. In some embodiments (not shown), more than one stretchable strap is also used to couple the upper portion 324 with the upper portion 334 in a similar configuration as the stretchable straps 350 and 351 to adjustably fit the strap system to the user's head.

In some embodiments (not shown), the flexible strap system 300 includes a single stretchable strap to couple a free end of the upper portion 324 with a free end of the upper portion 334, and/or a single stretchable strap to couple a free end of the lower portion 326 with a free end of the lower portion 336, to adjustably fit the strap system 300 to the user's head.

Figure 4:
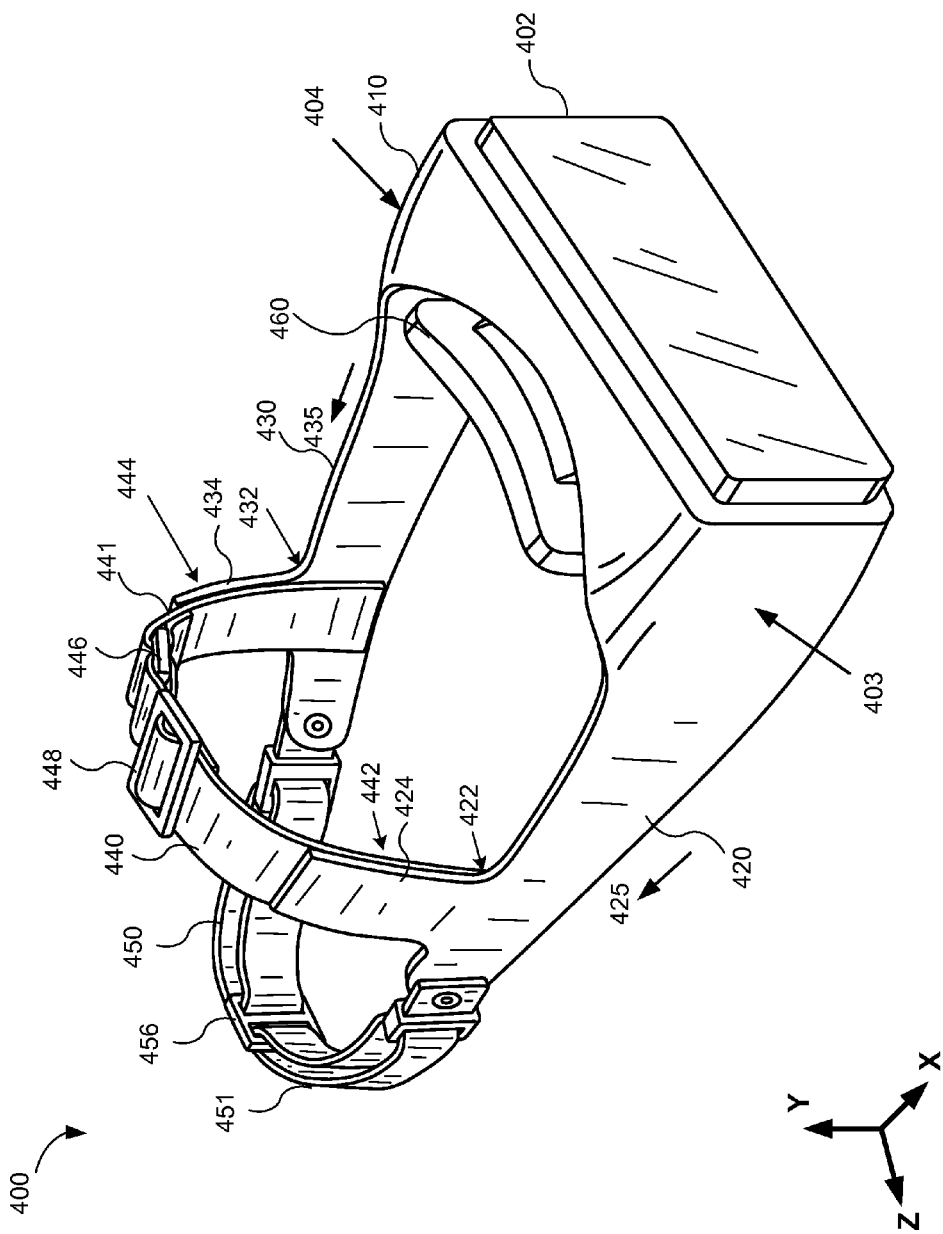

FIG. 4 is a perspective view of a flexible strap system 400 for a head-mounted display 402 in accordance with some embodiments. As shown in FIG. 4, the flexible strap system 400 is used for encasing the head-mounted display 402 and mounting the head-mounted display 402 on a user's head. The flexible strap system 400 includes an encasing section (i.e., region, portion) 410 to wrap around the head-mounted display 402. The encasing section 410 extends laterally towards the user's ears when the head-mounted display is on the user's head. The flexible strap system 400 also includes a side section 420 to extend from a first side 403 (e.g., right side) of the encasing section 410 along a first direction 425 (e.g., substantially laterally, along −X dimension) towards the back of the user's head. The flexible strap system 400 also includes a side section 430 to extend from a second side 404 (e.g., left side) of the encasing section 410 along a second direction 435 (e.g., substantially laterally, along X dimension) towards the back of the user's head. In some embodiments, the side section 420 substantially mirrors the side section 430. The encasing section 410, the side section 420, and the side section 430 are considered as a first flexible non-stretchable section, a second flexible non-stretchable section, and a third flexible non-stretchable section respectively of the flexible strap system 400.

In some embodiments, the flexible strap system 400 further includes one or more stretchable top straps (e.g., stretchable top straps 440 and 441) coupled between the side section 420 and the side section 430 to extend across a top region of the user's head when the head-mounted display 402 is on the user's head. In some embodiments as shown in FIG. 4, the stretchable top strap 440 includes a first end coupled to (442) the side section 420 and a second end, while the stretchable top strap 441 also includes a first end coupled (444) to the side section 430 and a second end. The second end of the stretchable top strap 440 is coupled to the second end of the stretchable top strap 441 using a strap connector 446 or any other suitable method. In some embodiments, the top stretchable strap 440 also includes an adjuster 448 for changing the length of the strap to adjustably conform to a top region of the user's head. In some embodiments, the flexible strap system 400 includes a single stretchable top strap coupled between the side section 420 and the side section 430 to extend across a top region of the user's head when the head-mounted display 402 is on the user's head.

In some embodiments, a branch 424 protrudes upward from a portion 422 of the side section 420 towards a top region of the user's head. In some embodiments, the branch 424 is coupled to (e.g., 442) the first end of the top strap 440 by stitching, screwed, adhesion, etc. In some embodiments, a branch 434 protrudes upward from a portion 432 of the side section 320 towards the top region of the user's head. In some embodiments, the branch 434 is coupled to (e.g., 444) the second end of the top strap 440 by stitching, screwed, adhesion, etc.

In some embodiments, the flexible strap system 400 includes one or more stretchable straps, such as a stretchable strap 450 and a stretchable strap 451, to couple a free end of the side section 420 with a free end of the side section 430 to adjustably conform to a back region of the user's head. In some embodiments as shown in FIG. 4, the stretchable strap 450 and the stretchable strap 451 are connectable (e.g., using a strap connector 456) to conform to a back region of the user's head (e.g., below, above, or across the occipital lobe) when the head-mounted display 402 is mounted on the user's head. In some embodiments, the stretchable straps (e.g., the stretchable straps 450 and 451) and the top straps (e.g., the top straps 440 and 441) are combined to hold and balance the weight of the head-mounted display 402 when the head-mounted display 402 is on the user's head.

In some embodiments, the side section 420 and the side section 430 have suitable lengths such that a free end of the side section 420 is connectable with a free end of the side section 430 to adjustably conform to a back region of the user's head, for example, using hook-and-loop fasteners (e.g., 342 of FIG. 3). In some embodiments, the encasing section 410, the side section 420, the side section 430, the branch 424 and the branch 434 are sections of a continuous piece of material, which is made of a flexible (e.g., bendable) and non-stretchable material, such as synthetic rubber, polyurethane sheet or nylon webbing. In some embodiments, the strap system 400 includes a forehead pad 460 that is substantially similar to the forehead pad 160 (FIG. 1).

Figure 5:
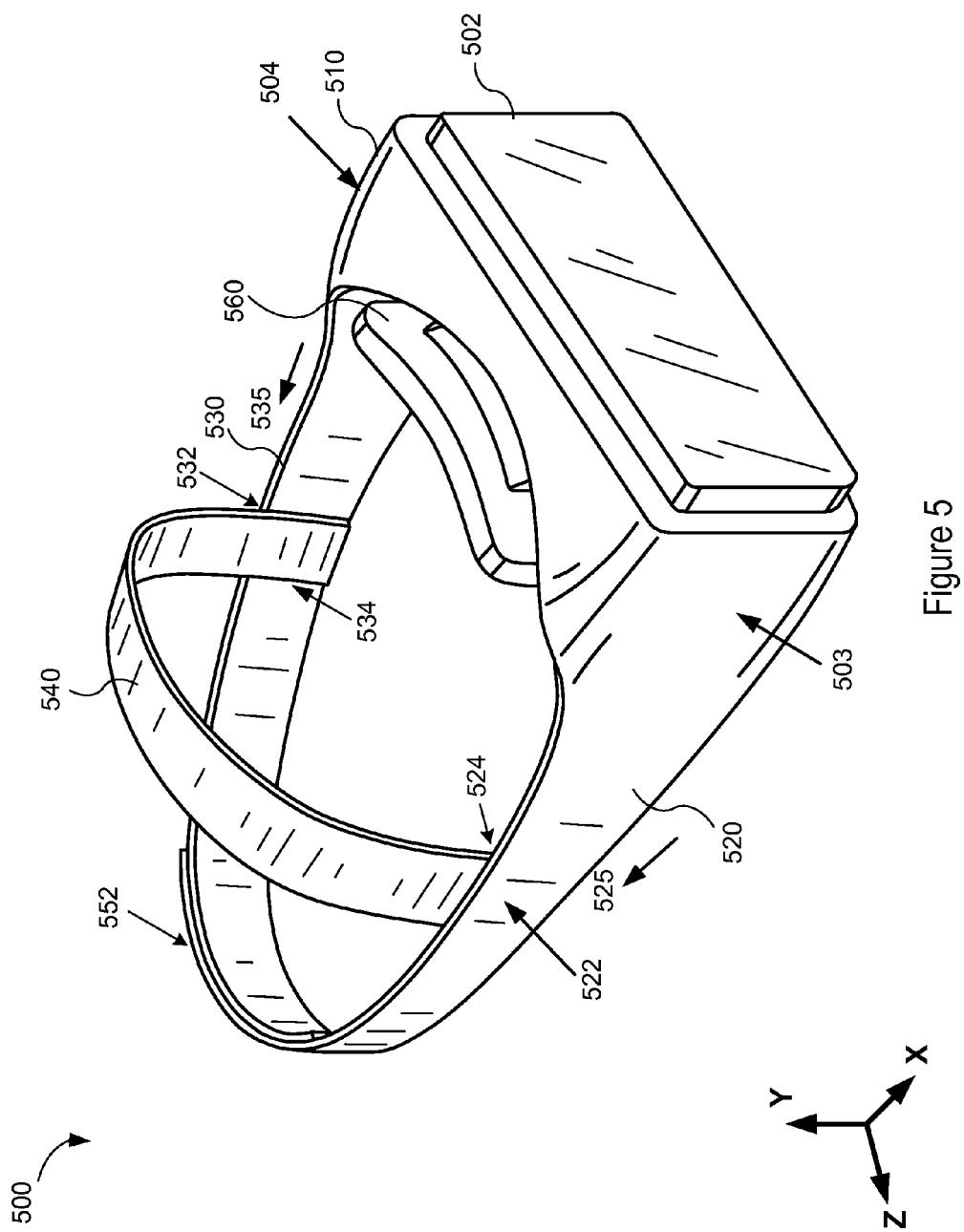

FIG. 5 is a perspective view of a flexible strap system 500 for a head-mounted display 502 in accordance with some embodiments. Similar to the flexible strap system 400 (FIG. 4), the flexible strap system 500 includes an encasing section (i.e., region, portion) 510 for encasing the head-mounted display 502, and a side section 520 and a side section 530 that extend from sides 503 (e.g., right) and 504 (e.g., left) of the encasing section 510 respectively towards the user's ears. The encasing section 510, the side section 520, and the side section 530 are considered as a first flexible non-stretchable section, a second flexible non-stretchable section, and a third flexible non-stretchable section respectively of the flexible strap system 500. In some embodiments, the flexible strap system 500 further includes a top strap 540 coupled between the side section 520 and the side section 530. In some embodiments, the strap system 500 also includes a forehead pad 560 that is substantially similar to the forehead pad 160 (FIG. 1). In some embodiments, various sections and features of the flexible strap system 500 are substantially similar to the corresponding sections and features of the flexible strap system 400 (FIG. 4). The flexible strap system 500 may also include various additional features that have not been illustrated for the sake of brevity and so as not to obscure pertinent features of the example embodiments disclosed herein, and a different arrangement of features may be possible.

In some embodiments as shown in FIG. 5, a first end of the top strap 540 is coupled to (522) to a portion 522 of the side section 520 (e.g., by stitching, screwing, or adhesion, etc.), and a second end opposite to the first end of the top strap 540 is coupled to (532) a portion 534 of the side section 530 (e.g., by stitching, screwing, or adhesion, etc.). In some embodiments, the top strap 540 is made of an elastic and stretchable material, such as polyester woven elastic.

In some embodiments, a free end of the side section 520 is connectable with a free end of the side section 530 to adjustably conform to the back of the user's head. For example, the free end of the side section 520 is connected to the free end of the side section 530 using hook-and-loop fasteners 552. In some embodiments, a length of the side section 520 is substantially equal to a length of the side section 530. In some embodiments, the length of the side section 520 is substantially longer or shorter than the length of the side section 530. In some embodiments, the side sections 520 and 530, when coupled, conform to a back region of the user's head (e.g., below, above, or across the occipital lobe) when the head-mounted display 502 is mounted on the user's head.

Figure 6:
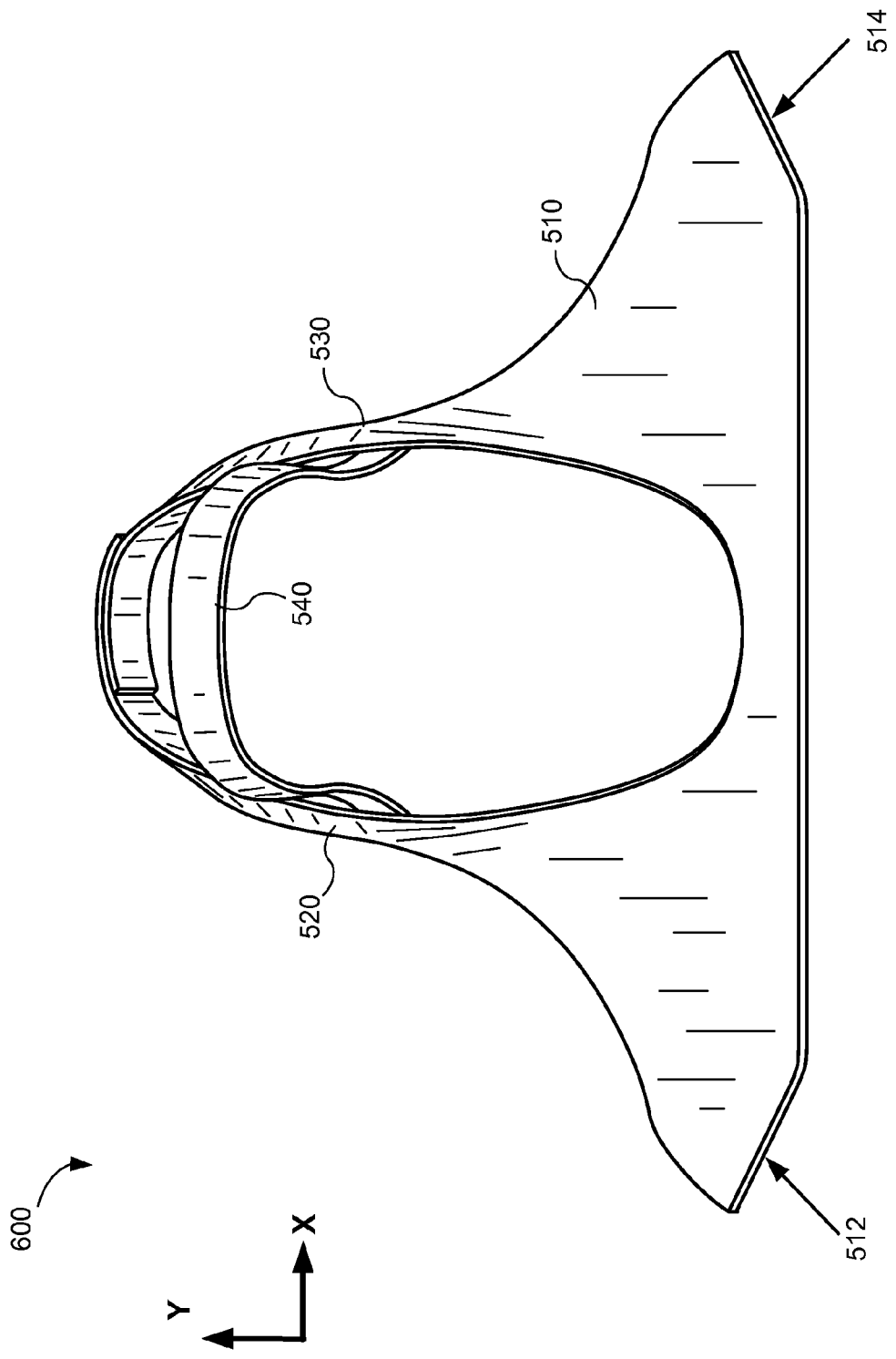
FIG. 6 is a top view of a continuous piece of material including various sections of a flexible strap system for a head-mounted display in accordance with some embodiments.

FIG. 6 is a top view of a continuous piece of material 600 including various sections of a flexible strap system for a head-mounted display in accordance with some embodiments. The flexible strap system 500 is used as an example to discuss the continuous piece 600 in FIG. 6. However, the sections of other flexible strap systems can also be sections of a continuous piece of material.

As shown in FIG. 6, the continuous piece 600 includes the encasing section 510, the side section 520, and the side section 530. (The top strap 540 is not part of the continuous piece 600 but is shown for context.) In some embodiments, the continuous piece 600 is made of a flexible (e.g., bendable) and non-stretchable material, such as synthetic rubber, polyurethane sheet, or nylon webbing. In some embodiments as illustrated in FIG. 6, the encasing section 510 has a first curved end 512 and a second curved end 514 extending opposite to each other along X dimension. When the encasing section 510 wraps around the frame of a head-mounted display, the first curved end 512 and the second curved end 514 jointly form a concave portion located at the center of a lower surface of the head-mounted display. When the head-mounted display is on the user's head, the concaved portion is at the center of the lower surface of the head-mounted display to fit the user's nose.

As discussed herein, the flexible strap system includes a plurality of sections which coordinate with each other to provide force couple(s) to support the weight of the head-mounted display and provide a balanced and comfortable wearing experience when the head-mounted display is on the user's head. For example, the flexible strap system includes a section (i.e., portion, region) to conform to a region of the user's head below the occipital lobe (i.e., occipital protuberance). In some embodiments, this section below the occipital lobe coordinates with a section of the strap system near a front region of the user's head to provide a force couple to support the mass of a head-mounted display when the head-mounted display is on the user's head. In some embodiments, the flexible strap system includes a section (i.e., portion, region) to conform to an upper-back region of the user's head above the occipital lobe. This section above the occipital lobe coordinates with other sections of the flexible strap system to balance and stabilize the head-mounted display on the user's head. Additionally, the flexible strap system discussed herein allows minimum or no weight bearings on the user's cheek or nose when the head-mounted display is on the user's head. Therefore, unlike the straps for ski goggles which rely on friction between the straps and the user's head and the friction between the goggles and the user's face to hold and balance the weight of the goggles, the flexible strap systems discussed in the present disclosure provide a much improved user experience.

Although some of various drawings illustrate a number of sections, portions, regions, and/or areas in a particular arrangement, parts which are not structure-dependent may be re-arranged and other parts may be combined. While some re-arrangement or other groupings are specifically mentioned, others will be apparent to those of ordinary skill in the art, so the re-arrangement and groupings presented herein are not an exhaustive list of alternatives.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A strap system for a head-mounted display, comprising:
   a first flexible non-stretchable section to wrap around the head-mounted display and extend laterally towards a user's ears, wherein the first flexible non-stretchable section is a continuous piece of material;
   a second flexible non-stretchable section to extend from a first side of the first flexible non-stretchable section towards the back of the user's first ear and split into an upper portion and a lower portion, wherein:
      the upper portion of the second flexible non-stretchable section is to extend in a first direction on the user's head and conform to a first region of the user's head, and
      the lower portion of the second flexible non-stretchable section is to extend in a second direction to conform to a second region of the user's head, wherein the lower portion of the second flexible non-stretchable section is below the upper portion of the second flexible non-stretchable section when the head-mounted display is on the user's head; and
   a third flexible non-stretchable section to extend from a second side of the first flexible non-stretchable section towards the back of the user's second ear and split into an upper portion and a lower portion, wherein:

the upper portion of the third flexible non-stretchable section is to extend in a third direction on the user's head and conform to a third region of the user's head, wherein the third direction substantially mirrors the first direction, and the lower portion of the third flexible non-stretchable section is to extend in a fourth direction to conform to a fourth region of the user's head, wherein the lower portion of the third flexible non-stretchable section is below the upper portion of the third flexible non-stretchable section when the head-mounted display is on the user's head.

2. The strap system of claim 1, wherein the upper portion of the second flexible non-stretchable section and the upper portion of the third flexible non-stretchable section are to extend towards a top region of the user's head.

3. The strap system of claim 1, wherein:
the lower portion of the second flexible non-stretchable section is to extend downward and the second region of the user's head is below the user's occipital lobe on the first side; and
the lower portion of the third flexible non-stretchable section is to extend downward and the fourth region of the user's head is below the user's occipital lobe on the second side.

4. The strap system of claim 1, wherein the upper portion of the second flexible non-stretchable section and the upper portion of the third flexible non-stretchable section are to extend towards an upper-back region of the user's head above the user's occipital lobe.

5. The strap system of claim 1, wherein the upper portion of the second flexible non-stretchable section and the upper portion of the third flexible non-stretchable section are to extend towards a top-front region of the user's head.

6. The strap system of claim 5, wherein:
the upper portion and the lower portion of the second flexible non-stretchable section extend opposite to each other along a first linear dimension,
the upper portion and the lower portion of the third flexible non-stretchable section extend opposite to each other along a second linear dimension, and
the second linear dimension substantially mirrors the first linear dimension.

7. The strap system of claim 1, wherein a free end of the upper portion of the second flexible non-stretchable section is connectable with a free end of the upper portion of the third flexible non-stretchable section to adjustably conform to the top of the user's head.

8. The strap system of claim 1, further comprising a stretchable strap to couple a free end of the upper portion of the second flexible non-stretchable section with a free end of the upper portion of the third flexible non-stretchable section, the stretchable strap having a first end coupled to the free end of the upper portion of the second flexible non-stretchable section and having a second end coupled to the free end of the upper portion of the third flexible non-stretchable section, to adjustably fit the strap system to the user's head.

9. The strap system of claim 1, further comprising:
a first stretchable strap having a first end and a second end, the first end of the first stretchable strap coupled to a free end of the lower portion of the second flexible non-stretchable section, and a second stretchable strap having a first end and a second end, the first end of the second stretchable strap coupled to a free end of the lower portion of the third flexible non-stretchable section, wherein the second end of the first stretchable strap is connectable with the second end of the second stretchable strap using a connector to adjustably fit the strap system to the user's head.

10. The strap system of claim 1, further comprising: a forehead pad coupled to a center of the first flexible non-stretchable section to rest against the user's forehead when the head-mounted display is on the user's head.

11. The strap system of claim 1, wherein the second flexible non-stretchable section and the third flexible non-stretchable section are sections of the continuous piece of material.

12. A strap system for a head-mounted display, comprising:
a first flexible non-stretchable section to wrap around the head-mounted display and extend laterally towards a user's ears, wherein the first flexible non-stretchable section is a continuous piece of material;
a second flexible non-stretchable section to extend from a first side of the first flexible non-stretchable section along a first direction towards the back of the user's head;
a third flexible non-stretchable section to extend from a second side of the first flexible non-stretchable section along a second direction toward the back of the user's head; and
a stretchable top strap coupled between the second flexible non-stretchable section and the third flexible non-stretchable section, to extend across a top region of the user's head,
wherein the top strap includes a first end coupled to the second flexible non-stretchable section and a second end coupled to the third flexible non-stretchable section, the first end and the second end of the top stretchable band being opposite to each other.

13. The strap system of claim 12, wherein the strap system further comprises:
a first branch to protrude upward from a portion of the second flexible non-stretchable section towards a top region of the user's head, the first branch coupled to the first end of the top strap; and
a second branch to protrude upward from a portion of the third flexible non-stretchable section towards the top region of the user's head, the second branch coupled to the second end of the top strap.

14. The strap system of claim 12, further comprising one or more stretchable straps to couple a free end of the second flexible non-stretchable section with a free end of the third flexible non-stretchable section to adjustably conform to a back region of the user's head.

15. The strap system of claim 12, wherein a free end of the second flexible non-stretchable section is connectable with a free end of the third flexible non-stretchable section to adjustably conform to a back region of the user's head.

16. The strap system of claim 12, wherein the second flexible non-stretchable section and the third flexible non-stretchable section are sections of the continuous piece of material.

* * * * *